US006853727B1

(12) United States Patent
Foster et al.

(10) Patent No.: US 6,853,727 B1
(45) Date of Patent: Feb. 8, 2005

(54) FILE TABLE COPY PROTECTION FOR A STORAGE DEVICE WHEN STORING STREAMING CONTENT

(75) Inventors: Eric M. Foster, Owego, NY (US); Dennis E. Franklin, Endicott, NY (US); Wai Man Lam, Moheganlake, NY (US); Raymond E. Losinger, Endicott, NY (US); Chuck H. Ngai, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,069

(22) Filed: Mar. 23, 2000

(51) Int. Cl.[7] ............................................. G06F 13/20
(52) U.S. Cl. ...................... 380/239; 380/48; 380/239; 360/15; 386/46
(58) Field of Search ..................... 380/38, 239; 360/15; 386/46

(56) References Cited

U.S. PATENT DOCUMENTS

| 5,619,571 A | * | 4/1997 | Sandstrom et al. ......... 380/200 |
| 5,631,693 A | | 5/1997 | Wunderlich et al. |
| 5,673,373 A | * | 9/1997 | Nosaki et al. ............. 358/1.15 |
| 5,732,239 A | | 3/1998 | Tobagi et al. |
| 5,745,643 A | * | 4/1998 | Mishina ..................... 386/106 |
| 5,886,841 A | | 3/1999 | Kikuchi et al. |

FOREIGN PATENT DOCUMENTS

| EP | 0 908 810 A2 | 4/1999 | |
| EP | 0908810 A2 * | 4/1999 | ............. G06F/1/00 |
| WO | WO 99/35562 | 7/1999 | |
| WO | WO 99/44364 | 9/1999 | |

* cited by examiner

*Primary Examiner*—Emmanuel L. Moise
*Assistant Examiner*—Taghi T. Arani
(74) *Attorney, Agent, or Firm*—Whitham, Curtis & Christofferson, P.C.; William H. Steinberg

(57) ABSTRACT

Copy protection is provided at a mass storage device provided in or connected to a decoder for receiving digital transmissions of audio and video program material by virtual scrambling of blocks of data. Non-sequential storage locations for blocks of data are defined in accordance with a key and the file allocation table is encrypted and stored. Thus blocks of data remain intact and need not be decrypted upon playback, reducing processing time, while the program is effectively protected from reassembly without decryption of the file allocation table. The key(s) may be maintained internally within the decoder and need not be shared, thus avoiding a need for user identification and/or authentication. Software for encryption, including keys may be downloaded to the decoder through the same transmission link used for transmission of data files that may be encrypted in response to control signals or flags transmitted with data files to be protected.

27 Claims, 4 Drawing Sheets

FILE TABLE COPY PROTECTION FOR A STORAGE DEVICE WHEN STORING STREAMING CONTENT

BACKGROUND OF THE INVENTION

1. Field of the Invention

The present invention generally relates to transmission and presentation of broadcast digital video and audio program content and, more particularly, to protection of such data stored in a set-top box (STB) or mass storage device connectable thereto from unauthorized access.

2. Description of the Prior Art

Since its invention, television has been recognized to have great economic and social potential. At the present time, when wide bandwidth transmission systems such as coaxial cable systems are becoming relatively ubiquitous, much of the economic and social potential derives from the variety of programming or other information which can be provided to users and the willingness of users to pay for access to particular information, such as pay-per-view movies at a time convenient to them.

While coaxial cable distribution systems provide very substantial numbers of choices of information available as well as some capacity for so-called upstream signalling and even Internet communications of increased speed relative to telephone/modem arrangements, there is increased demand for wider variety and flexibility of programming which can only be provided, at the present state of the art, through digital communications using extremely broad band transmission media such as microwave, satellite and fiber optic links.

Even with these broad band communication media, the required capacity, the volume and variety of data contained in common programming requires extreme compression to support the number of separate communications which may be required to be transmitted over a communication link of finite although substantial capacity. Accordingly, a compression convention referred to as MPEG (Motion Picture Experts Group has been promulgated in several versions (e.g. MPEG-2) and has become an industry standard. This standard is extremely flexible and adaptive to transmission content to allow extreme compression and is largely compatible with error recovery and hiding arrangements which support acceptable video and audio playback even though the digital transmission medium is considered "lossy" and reception of data with missing or corrupted segments or packets is a common occurrence.

In order to implement this compression convention and recover decompressed data after transmission, a so-called "set-top box" (STB) has been developed and, at the current time, has a well-established architecture. The processing of which the STB is capable is, of course, very substantial since MPEG compression or any other type of digital video transmission must be very complex and must be performed reliably within a short period of time in order to present a potentially changing display without interruption. Generally, very little storage is provided for the audio and/or video signal in a STB for the simple reason that the signal usually must be used for display within a very short time after receipt.

However, public familiarity with the functions of video cassette recorders (VCRs) is increasingly leading to a demand for substantial storage to be provided within the STB and for further storage on an outboard mass storage device such as a hard disk drive or compact disk recorder/playback device together with user controls over playback and recording similar to those provided by VCRs. The MPEG STB architecture provides for such storage in an encoded and compressed digital form to limit the data storage capacity required with decompression and decoding upon playback. Storage in digital form also allows such storage to be performed with no increased loss of video or audio fidelity.

Additionally, user demand for specialized features and image enhancement has required substantially increased complexity beyond the demands of MPEG processing. For example, a separate microprocessor and substantial memory is generally included and dedicated to provide user-definable functions such as overlays, picture-in-picture displays, graphics overlays and other image manipulations. This additional hardware complexity has pushed the cost of the STB close to the limit of consumer acceptance and economic viability. Therefore, additional functions may only be included if they can be implemented very economically with little additional hardware and without use of the additional dedicated microprocessor.

To protect the value of data distributed over such a system, it is desired to protect selected data from unauthorized access. This is generally done at the current state of the art by encryption of the data. This encryption requires considerable data manipulation under severe and critical time constraints as well as additional storage and secure handling of encryption keys that must be shared between devices when data is sourced from one device and played back on another as would generally be the case when the data is transmitted in encrypted form and decrypted and played back on another device such as a STB corresponding to an authorized access. This is also the case where an unauthorized recording could be made from an authorized STB that would generally be created for the purpose of playback on another STB or other apparatus. Accordingly, data recorded in or through a STB must be recorded in an encrypted form and decrypted during playback; increasing the processing burden to present the data (especially video) in the appropriate original time sequence.

At the present state of the art, no arrangement or technique has been suggested for providing encrypted storage with a reduced number of keys that reduces storage space and data manipulation requirements and remains effective to prevent unauthorized duplication of data from the STB. In this regard, copying of data as recorded in or through the STB can be rapidly performed relative to copying the decoded and decrypted audio and video signals on, for example, a video cassette recorder (VCR). (While some forms of copy protection exist to prevent copying of video programming on VCRs, no similar protection exists against copying the "clean" (although encoded and compressed) digital signals present at the level of STB storage.) Further, the digital storage of the STB allows rapid storage of multiple generations of copies of identical quality. Therefore, prevention of copying from a STB for playback on another STB or other device of similar functionality (e.g. a suitably programmed personal computer) is of substantially greater importance than preventing dubbing of video cassettes.

SUMMARY OF THE INVENTION

It is therefore an object of the present invention to provide an encryption technique compatible with digital audio and video transmission and reception and STB architectures allowing reduced data manipulation while providing storage in encrypted form in limited storage hardware.

It is another object of the invention to provide encryption with a single key or limited number of keys that can be securely handled in a simple manner and allows playback on an authorized STB while preventing playback on different devices.

It is a further object of the invention to provide effective protection of digitally transmitted data compatible with digital audio/video standards and STB architectures which can be implemented with very little additional hardware in a STB.

In order to accomplish these and other objects of the invention, a method of encryption of a data file transmitted to or from a mass storage device such as a hard disk drive is provided having steps of defining a write order of data blocks of a data file to non-sequential storage locations of a mass memory in accordance with a first key and allocating corresponding sectors in a file allocation table in accordance with a second key, storing the data blocks in memory in accordance with the write order and updating the file allocation table, encrypting the file allocation table with a third key, forming an encrypted file allocation table, and storing the encrypted file allocation table to the mass memory.

In accordance with another aspect of the invention, a decoder for receiving a data file is provided including an arrangement for defining a write order of data blocks to non-sequential storage locations of a mass memory in accordance with a first key and allocating corresponding sectors in a file allocation table in accordance with a second key, an arrangement for storing the data blocks in memory in accordance with the write order and updating the file allocation table, an arrangement for encrypting the file allocation table with a third key, forming an encrypted file allocation table, and an arrangement for storing the encrypted file allocation table to the mass memory.

Thus, in accordance with the invention, the order of the data blocks is virtually scrambled while the data within the data block remains intact, greatly reducing decryption processing during playback or reading of the data file. However, the order of the data blocks cannot be restored to reassemble the data file to a usable form without decryption of the file allocation table and effective copy protection is thus provided while avoiding a need for authentication of a user since the key(s) may be maintained internal to the decoder.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
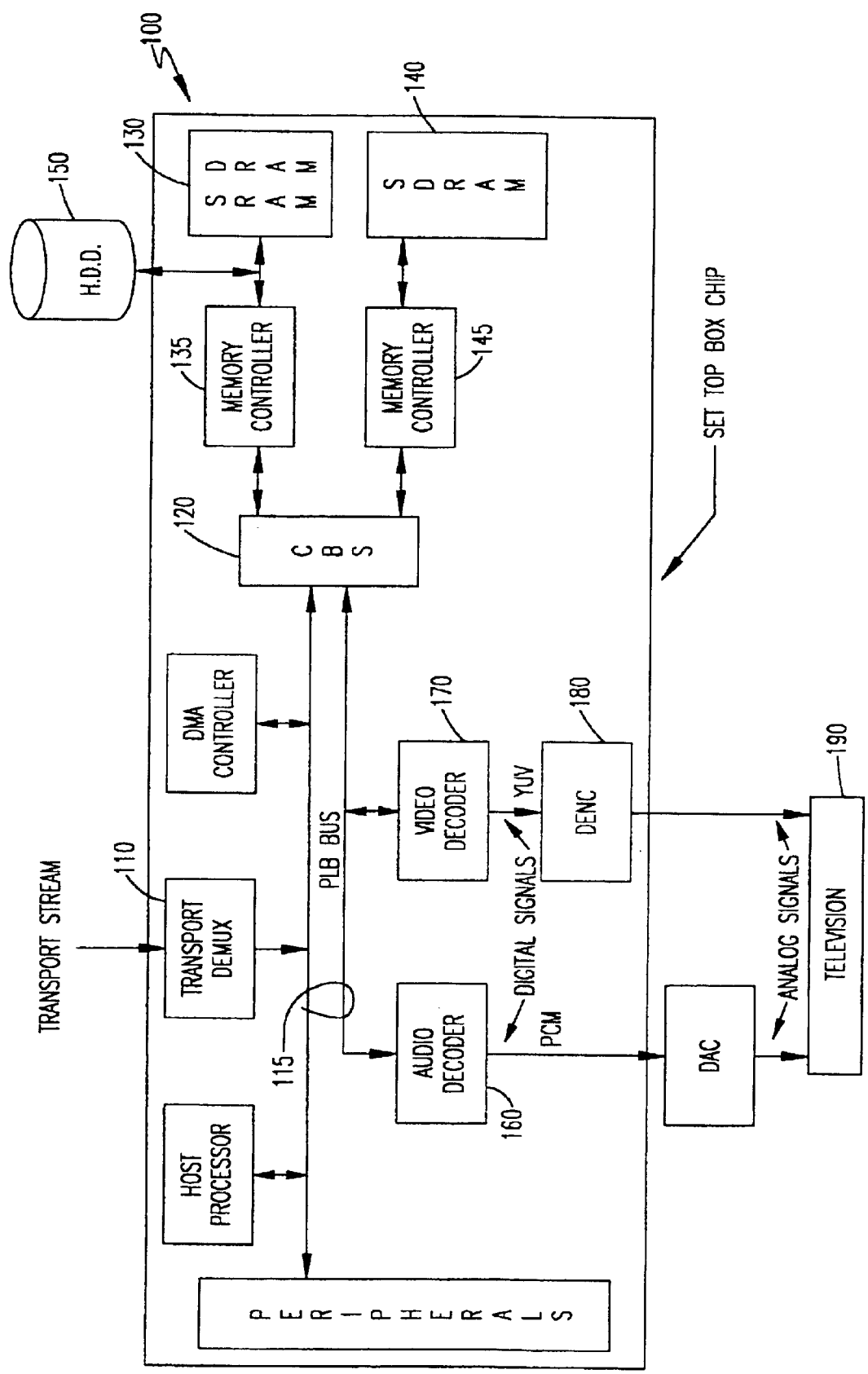
FIG. 1 is a high-level block diagram of an digital audio/video STB architecture.

Referring now to the drawings, and more particularly to FIG. 1, there is shown a high-level block diagram illustrating an exemplary architecture of a digital audio and video (e.g. MPEG compliant) set-top box (STB) chip 100. It should be appreciated that while the architecture depicted is generally known to those skilled in the art, no portion of FIG. 1 is admitted to be prior art in regard to the present invention. Further, it is a meritorious effect of the present invention that it may be implemented within the architecture of FIG. 1 without significant modification thereof. Accordingly, at the level of abstraction with which FIG. 1 is arranged, FIG. 1 is also illustrative of the preferred architecture with which the invention may be implemented.

Many of the functional elements of the STB chip architecture 100 will be familiar to those skilled in the art and need not be discussed in connection with the invention. It is sufficient to convey an understanding of the invention and to enable practice thereof to note that the MPEG transport stream is input thereto and demultiplexed at demultiplexer 110 where it is converted to a compressed and encoded, preferably packetized elementary stream (PES), format. These signals are placed on a PLB bus 115 and provided to cross-bar switch (CBS) 120 and stored in memories 130, 140 under control of respective memory controllers 135, 145 responsive to host processor 200 communicating to the memory controllers through CBS 120, as well.

It is important to an understanding of the need for the invention that a port may be provided on the STB for outboard mass data storage such as hard disk drive (HDD) 150. If not provided externally (e.g. if the HDD is provided internally of the STB), a similar port may be provided by a simple and possibly unauthorized modification of the STB, allowing recordings to be made on replaceable and transportable storage media. Therefore, any data to be protected must be encrypted.

Then, in substantially real time or under user control, the data is fetched from memories 130, 140 and/or 150 (generally from 150), using 130 or 140 as a demultiplexing buffer, separated into audio and video streams and decrypted, if necessary, at demultiplexing buffer 130 or 140. The audio and video signals are then decompressed and decoded into decompressed raw digital data at decoders 160 and 170, respectively. The video signal is then encoded into a standard analog formal (e.g. PAL or NTSC) by digital encoder (DENC) 180 processing on the chip while digital to analog conversion of the audio signal is generally provided off-chip. The respective analog video and audio signals are then provided to a television set or monitor 190 for presentation to the user.

Figure 2:
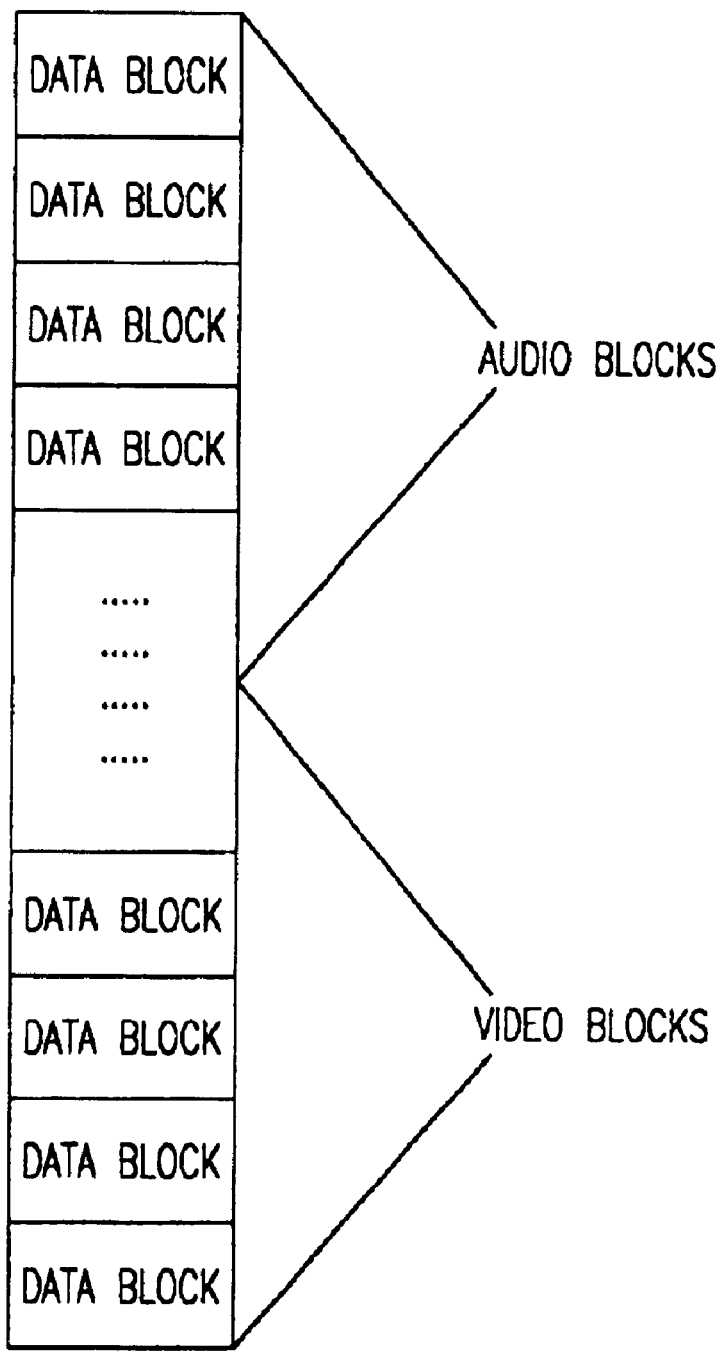
FIG. 2 illustrates an exemplary memory queue as stored in or through a STB such as that schematically depicted in FIG. 1.

It is important to an understanding of the invention to note that continuous audio/video program content is articulated in memory queues of preferably fixed size in memories 130 or 140 until ready to be transferred to mass storage 150. A memory queue is also further articulated or structured in blocks (sometimes referred to as sub-blocks to distinguish from a larger block accumulated therefrom for storage) of fixed size. For example, a 1 Meg memory queue may contain video blocks of 64 KBytes each or audio blocks of 512 Bytes each. Data in a block within a memory queue may be comprised of audio data or video data but not both. An exemplary 1 Meg memory queue is illustrated in FIG. 2 with brackets indicating audio and video blocks for clarity but it is to be understood that in practice audio and video packets in such blocks are interleaved. While the following discussion will assume memory queues and data blocks of given size(s) for clarity, it should be understood and kept in mind that the practice of the invention does not rely on any particular data block size and any size block and any combination of data block sizes within a memory queue of any size can be readily accommodated.

Figure 3:
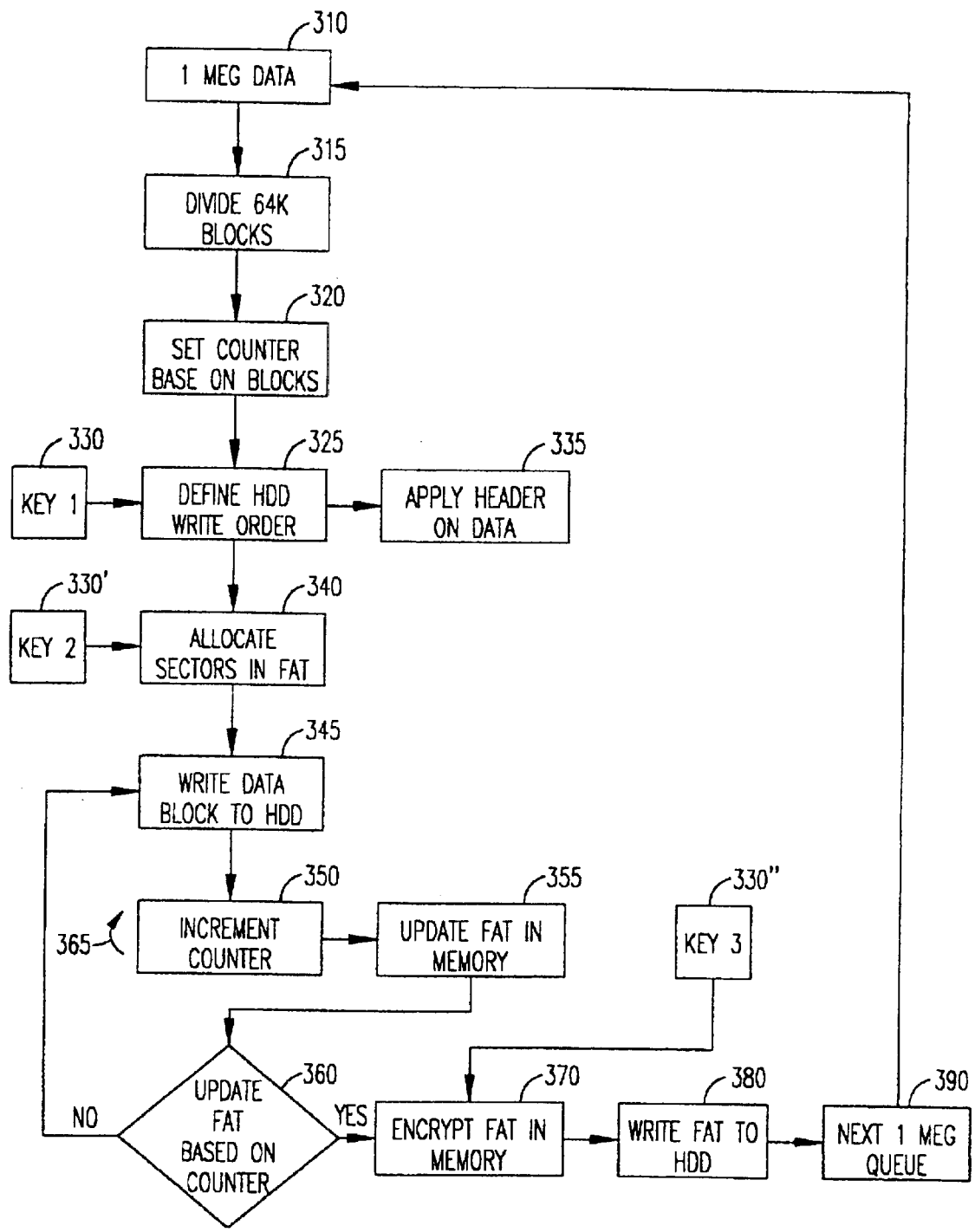
FIG. 3 is a flow chart illustrating operation of the invention.

Referring now to FIG. 3, operation of the invention within the architecture of FIG. 1 will now be explained. The operations to be described below are principally carried out by host processor 200 which can be suitably programmed without contributing to the processing burden of either the MPEG processing or the dedicated processor alluded to above. The invention employs virtual scrambling of data by encryption of the file allocation table (FAT) as the data is stored to a mass storage device. For this reason, all functions can be carried out by a memory subsystem (e.g. DMA)

under minimal control from host processor 200 and can be applied to any or all transfers of data between memory 140 and 150 while isolating such application of encryption from control by the user.

It should be understood that the processing burden of control of the memory controllers is sufficiently light that the dedicated processor can be used without compromise of other desired functions and such use may provide simplification of some other functions such as scanning the program content for particular locations, as discussed in concurrently filed U.S. patent application Ser. No. 09/534,643 assigned to the assignee of the present invention and hereby fully incorporated by reference. Alternatively, an additional processor can be provided at relatively little expense since processing requirements for control of the memory controller 135 is minimal to provide encryption without modification of the full granularity of the data in accordance with the invention.

Each memory queue is processed in turn beginning with a first memory queue of program content. Data or a flag anywhere within a header associated with the first data block of transmitted data can be used to invoke the invention for encryption of the entirety of any program and maintain the protection with any and all copies of the program content that may be made. By the same token, a flag or other data in a first memory queue of an encrypted copy of the program content can invoke the invention to provide decryption on the same STB upon playback.

At step 310 of FIG. 3, a memory queue (e.g. 1 MB of data) is processed to determine the number of blocks therein. Block size is of no consequence in this processing which may be as simple as counting the number of block headers in the memory queue being encrypted. The memory queue can be arbitrarily divided into blocks of any convenient size, as depicted at step 315 as long as audio and video data are segregated into respective data blocks as discussed above and the memory queue can be of any convenient size.

Figure 4:
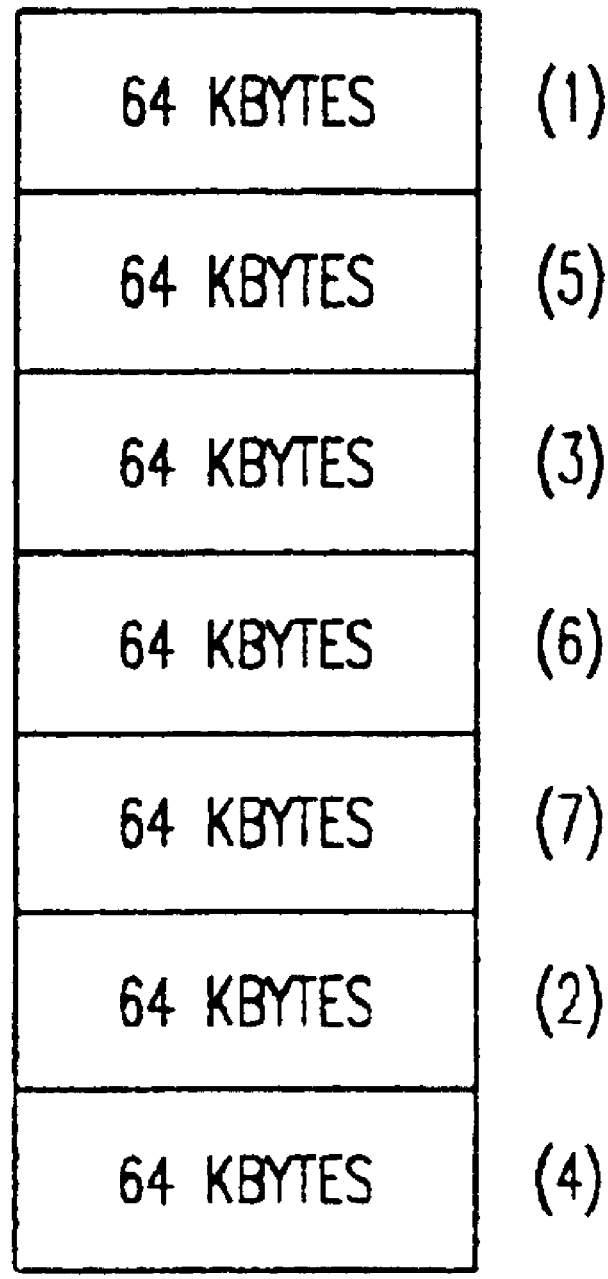
FIG. 4 illustrates blocks of data containing continuous program content which are encrypted in accordance with FIG. 3.

Assuming a block size of 64 KB, an exemplary articulation of a memory queue is depicted in FIG. 4. (Seven blocks are shown as a matter of convenience and to indicate the number of blocks is arbitrary. Ordinarily sixteen 64 KB data blocks would be provided in a 1 Meg memory queue.) Based on the number of blocks found in the memory queue, a counter, generally provided in a memory controller, is set, as depicted at step 320. The value with which the counter is set represents the total number of blocks within the memory queue but the value may or may not equal the number of blocks (e.g. an offset may be provided). Each data block is then assigned a sector number (or write order generated at step 325 as determined by a key (e.g. key 1) 330 in accordance with an algorithm, system ID, STB ID, etc., as desired but should be unique to the STB or effectively so.

Each data block header is then updated to include the assigned sector number as indicated at 335 as is generally provided by host processor 200; the difference from normal operation of a host processor at this point being derived from the setting of the counter and the encryption, in accordance with key 1, of the sector number assigned. That is, at this point, the data in the queue remains in order but has been "virtually" scrambled out of order based on key 1. The encryption of the sector numbers thus causes the physical pointing to non-sequential sectors when the data is written to mass storage 150.

Next, entries in a local copy of the FAT in memory 130 are allocated for data blocks to be written to mass storage 150 at the sector location indicated in the header of each data block as shown at step 340. Non-sequential entries may be selected based on key 2 330' which may be and preferably is the same as key 1. The data blocks are then written to the sectors indicated in their respective headers (step 345) with the storage of each block being followed by incrementing of the counter (step 350), updating of the FAT in memory and repeating steps 340, 345 and 350 for each data block until the counter indicates that all data blocks in the memory queue have been stored to mass storage 150 (step 360), looping as indicated at 365. Then, as depicted at step 360, the FAT is encrypted with key 3 330" which, again, is preferably the same as key 1. The encrypted FAT is then written to mass storage 150, the next memory queue is called as indicated at steps 380 and 390, respectively and the process is repeated, looping to step 310.

During playback, decryption is performed by decrypting the FAT retrieved from mass storage 150 in accordance with key 3 and then simply reading the data blocks from non-sequential sectors; thus avoiding any need to decrypt the data itself and avoiding the data processing burden thereof. The sector number in the header may, however, be decrypted in accordance with key 1 to assure correct reassembly of the memory queue.

It should be noted that in the case of an STB storing data for later playback on the same STB, only one key is required and is maintained only within the STB. Therefore, key 2 (and keys 2 and 3, as well, if different) are kept private within the STB and may be adequately protected by simple hardware and software safeguards therein. The lack of a need to share keys between devices in this circumstance avoids any need for complex authentication processes while assuring that a copy made on a given STB can only be replayed on the same STB. In addition, the key(s) and encryption/decryption software can be updated in the field through downloads using the MPEG transport stream itself for distribution. By the same token, a different STB can be enabled to play back the recorded copy of the data by downloading of a key corresponding to the authorized STB upon suitable authorization from the data provider. Thus, transfer of copies between STBs can be effectively controlled and limited while allowing great flexibility of service from the data provider.

In view of the foregoing, it is seen that the invention provides for simplified encryption adequate to protect data from unauthorized access without requiring any additional hardware and very minimal additional processing overhead. The minimal processing is provided by the host processor 200 through simple manipulation of a counter and sector address transformation at memory controller 140. The minimal software encryption/decryption algorithm also facilitates downloading over an MPEG compliant system. Once the key(s) and/or encryption/decryption software are downloaded, they remain private to the STB and are adequately protected by simple safeguards against user access. Default key(s) may be provided unique to specific STBs in any number of ways such as ROM, EEPROM jumpers and the like. No decryption burden is imposed upon playback, thus further reducing processing burden and facilitating operator control of the playback process and responsiveness of the STB to such user control.

While the invention has been described in terms of a single preferred embodiment, those skilled in the art will recognize that the invention can be practiced with modification within the spirit and scope of the appended claims.

What is claimed is:

1. A method of encryption of a data file transmitted to a decoder, said method comprising steps of defining a write order of data blocks of said data file to non-sequential storage locations of a mass memory, storing said data blocks in said mass memory in accordance with said write order and updating a table having a plurality of entries corresponding to a plurality of said non-sequential storage locations, said table being located independently of said data file, encrypting the table with a key unique to the decoder, forming an encrypted table, and storing said encrypted table to said mass memory.

2. A method as recited in claim 1 wherein said mass memory is a hard disk drive.

3. A method as recited in claim 1 wherein said mass memory is a compact disk recorder/player.

4. A method as recited in claim 1, wherein said updating in said table is performed in accordance with a second key.

5. A method as recited in claim 4, wherein said encrypting step is performed in accordance with a third key.

6. A method as recited in claim 4, wherein said key and said second keys are identical.

7. A method as recited in claim 5, wherein said second and third keys are identical.

8. A method as recited in claim 5, wherein said key and said third keys are identical.

9. A method as recited in claim 1, including the further steps of loading a portion of said data file, as blocks of data, into a memory queue, setting a counter in accordance with a number of blocks in said memory queue, and performing said step of defining a write order in accordance with said counter.

10. A method as recited in claim 1, wherein said data file contains audio and video data, said method including the further step of separating audio and video into respective data blocks.

11. A method as recited in claim 1, wherein said data blocks include headers, said method including the further step of including said write order in said header.

12. A method as recited in claim 1, including a further step of transmitting encryption software for performing said encryption of said data file to said decoder.

13. A method as recited in claim 12, wherein said encryption software includes said first key.

14. A decoder for receiving a digital transmission of a data file including means for defining a write order of data blocks of said data file to non-sequential storage locations of a mass memory, means for storing said data blocks in memory in accordance with said write order and updating a table having a plurality of entries corresponding to a plurality of said non-sequential storage locations, said table being located independently of said data file, means for encrypting the table with a key unique to the decoder, forming an encrypted table, and means for storing said encrypted table to said mass memory.

15. A decoder as recited in claim 14, wherein said means for storing said data utilizes a second key and said means for encrypting the table utilizes a third key.

16. A decoder as recited in claim 15, wherein two of said first, second and third keys are identical.

17. A decoder as recited in claim 14, further including means for loading a portion of said data file, as blocks of data, into a memory queue, and means for setting a counter in accordance with a number of blocks in said memory queue wherein said means for defining a write order is responsive to said counter.

18. A decoder as recited in claim 14, wherein one of said key, said second key and said third key is not shared with any other device.

19. A decoder as recited in claim 14, further including means for receiving encryption software for encrypting said data file.

20. A decoder as recited in claim 14, further including a port to an outboard mass storage device.

21. A method as recited in claim 1, wherein said table and said encrypted table are a file allocation table and an encrypted file allocation table, respectively.

22. A method as recited in claim 1, wherein said defining step is performed in accordance with a first key and allocates corresponding sectors of said mass memory.

23. A decoder as recited in claim 14, wherein said table and said encrypted table are a file allocation table and an encrypted file allocation table, respectively.

24. A decoder as recited in claim 14, wherein said means for defining a write order is performed in accordance with a first key and includes means for allocating corresponding sectors of said mass memory.

25. A method of protecting streaming data stored in a storage device by a decoder, the method comprising steps of:

writing streaming data in data blocks in a memory, scrambling the write order of the data blocks containing streaming data when storing the data blocks containing the streaming data in the storage device, creating a table describing the scrambling order of the data blocks of streaming data in the storage device, there being a plurality of entries in said table corresponding to a plurality of said data blocks, said table being located independently of said streaming data, and encrypting the table with a key unique to the decoder and storing the encrypted table in the storage device.

26. A method as recited in claim 25, wherein said memory is a random access memory.

27. A method as recited in claim 25, wherein said table is a file allocation table.

* * * * *